(12) United States Patent
Tiwary et al.

(10) Patent No.: US 11,379,270 B2
(45) Date of Patent: Jul. 5, 2022

(54) CLUSTERING TENANTS BASED ON TENANCY KNOWLEDGE GRAPH

(71) Applicant: SAP SE, Walldorf (DE)

(72) Inventors: Mayank Tiwary, Rourkela (IN); Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 74 days.

(21) Appl. No.: 17/103,787

(22) Filed: Nov. 24, 2020

(65) Prior Publication Data

US 2022/0164227 A1 May 26, 2022

(51) Int. Cl.
| | | |
|---|---|---|
| G06F 15/16 | (2006.01) | |
| G06F 9/54 | (2006.01) | |
| H04L 29/06 | (2006.01) | |
| G06F 9/50 | (2006.01) | |
| G06N 5/02 | (2006.01) | |
| G06N 3/04 | (2006.01) | |
| G06F 9/455 | (2018.01) | |
| G06K 9/62 | (2022.01) | |

(52) U.S. Cl.
CPC .......... *G06F 9/505* (2013.01); *G06F 9/45558* (2013.01); *G06K 9/6218* (2013.01); *G06N 3/04* (2013.01); *G06N 5/02* (2013.01); *G06F 2009/4557* (2013.01); *G06F 2009/45587* (2013.01)

(58) Field of Classification Search
CPC ... G06F 9/505; G06F 9/45558; G06K 9/6218; G06N 3/04; G06N 5/02
USPC ........................................................ 709/226
See application file for complete search history.

(56) References Cited

U.S. PATENT DOCUMENTS

| | | | |
|---|---|---|---|
| 9,009,704 B2* | 4/2015 | McGrath ................. | G06F 9/455 718/1 |
| 9,317,311 B2* | 4/2016 | Anderson ........... | G06F 9/45558 |
| 9,405,593 B2* | 8/2016 | McGrath ............... | G06F 9/5072 |
| 10,230,591 B2* | 3/2019 | Jain ......................... | H04L 47/52 |
| 10,296,262 B2* | 5/2019 | Aronovich ............ | G06F 3/0649 |
| 10,616,134 B1* | 4/2020 | Greenwood .......... | H04L 47/821 |
| 2008/0162536 A1* | 7/2008 | Becker .................... | G06F 16/25 707/999.102 |

(Continued)

OTHER PUBLICATIONS http://ns.inria.fr/ast/sql/index.html, SQL Abstract Syntax Trees Vocabulary, printed Sep. 13, 2020, 26 pages.

(Continued)

*Primary Examiner* — Hamza N Algibhah
(74) *Attorney, Agent, or Firm* — Klarquist Sparkman, LLP (57) ABSTRACT

A computer-implemented method includes constructing a tenancy knowledge graph having a plurality of tenant nodes representing respective tenants in a multitenant computing environment, a plurality of property nodes representing respective properties of the tenants, and a plurality of edges connecting the plurality of tenant nodes and the plurality of property nodes, transforming the plurality of property nodes to corresponding property vectors, performing random walks starting from the plurality of tenant nodes of the tenancy knowledge graph, feeding sequences of nodes traversed by the random walks into a neural network to generate a plurality of tenant vectors corresponding to the plurality of tenant nodes, and clustering the plurality of tenant nodes into one or more tenant clusters based on similarity of the plurality of tenant vectors.

20 Claims, 8 Drawing Sheets

(56) References Cited

U.S. PATENT DOCUMENTS

| | | | | |
|---|---|---|---|---|
| 2009/0271472 | A1* | 10/2009 | Scheifler | G06F 9/485 709/202 |
| 2010/0005055 | A1* | 1/2010 | An | G06F 16/256 707/E17.001 |
| 2010/0005443 | A1* | 1/2010 | Kwok | G06Q 10/10 717/100 |
| 2010/0077449 | A1* | 3/2010 | Kwok | G06F 9/5027 718/104 |
| 2011/0307452 | A1* | 12/2011 | Fly | G06F 21/577 707/687 |
| 2012/0173513 | A1* | 7/2012 | Agrawal | G06F 16/24545 707/716 |
| 2013/0132404 | A1* | 5/2013 | Liu | G06F 16/27 707/748 |
| 2016/0124818 | A1* | 5/2016 | Wang | G06F 11/3433 714/4.12 |
| 2017/0324813 | A1* | 11/2017 | Jain | H04L 67/1097 |
| 2018/0324203 | A1* | 11/2018 | Estes | G06F 9/5061 |
| 2019/0042911 | A1* | 2/2019 | Koren | G06N 7/005 |
| 2020/0371509 | A1* | 11/2020 | Mark | B29C 64/386 |
| 2021/0144517 | A1* | 5/2021 | Guim Bernat | G06F 9/4881 |

OTHER PUBLICATIONS https://www.jeremyjordan.me/autoencoders/, Introduction to autoencoders, printed Sep. 13, 2020, 17 pages.

https://medium.com/wisio/a-gentle-introduction-to-doc2vec-db3e8c0cce5e, a gentle introduction to Doc2Vec. TL;DR, Gidi Shperber, Wisio, Medium, printed Sep. 13, 2020, 10 pages.

https://towardsdatascience.com/introduction-to-word-embedding-and-word2vec-652d0c2060fa, Introduction to Word embedding and Word2Vec, Dhruvil Karani, Towards Data Science, printed Sep. 13, 2020, 7 pages.

https://towardsdatascience.com/multi-class-text-classification-with-doc2vec-logistic-regression-9da9947b43f4#:~:text=DBOW, Multi-Class Text Classification with Doc2Vec & Logistic Regression, by Susan Li, Towards Data Science, printed Sep. 13, 2020, 13 pages.

https://towardsdatascience.com/an-introduction-to-graph-neural-network-gnn-for-analysing-structured-data-afce79f4cfdc , An introduction to Graph Neural Network(GNN) for Analysing Structuring Data, Shanon Hong, Towards Data Science, printed Sep. 24, 2020, 17 pages.

https://medium.com/@BorisAKnyazev/tutorial-on-graph-neural-networks-for-computer-vision-and-beyond-part-1-3d9fada3b80d, Tutorial on Graph Neural Networks for Computer Vision and Beyond, Boris Knyazev, Medium, printed Sep. 24, 2020, 18 pages.

https://www.csa.iisc.ac.in/event/82/represeting-networks-centrality-node-embeddings-community-outliers-and-graph-representation/, CSA—IISc Bangalore, Printed Sep. 24, 2020, 4 pages.

https://medium.com/dair-ai/an-illustrated-guide-to-graph-neural-networks-d5564a551783, an Illustrated Guide to Graph Neural Networks, Rishabh Anand, dair.ai, Medium, printed Oct. 9, 2020, 10 pages.

Chen et al., "A Tutorial on Network Embeddings," Stony Brook University, Aug. 9, 2018, 24 pages.

Jure Leskovec, NRLTUTORIAL—Part2—GNNS, WWW-18 Tutorial: Representation Learning on Networks, http://snap.stanford.edu/proj/embeddings-www/files/nrltutorial-part2-gnns.pdf, printed Oct. 9, 2020, 66 pages.

Perozzi et al., "DeepWalk: Online Learning of Social Representations," Stonybrook University, Department of Computer Science, Jun. 27, 2014, 10 pages.

Scarselli et al., "The graph neural network model," IEEE Transactions on Neural Networks, 2009, vol. 20, No. 1, pp. 61-80.

Taft et al., "STeP: Scalable Tenant Placement for Managing Database-as-a-Service Deployments," SoCC' 16, Oct. 5-7, 2016, pp. 388-400.

Truyen et al., "Towards a container-based architecture for multi-tenant SaaS applications," Conference Paper, Dec. 2016, 7 pages.

Zheng et al., "AddGraph: Anomaly Detection in Dynamic Graph Using Attention-based Temporal GCN," Proceedings of the Twenty-Eighth International Joint Conference on Artificial Intelligence (IJCAI-19), Aug. 2019, pp. 4419-4425.

https://en.wikipedia.org/wiki/Multitenancy, Wikipedia, "Multitenancy," printed Oct. 7, 2020, 5 pages.

* cited by examiner

CLUSTERING TENANTS BASED ON TENANCY KNOWLEDGE GRAPH

BACKGROUND

In a multitenant computing environment (also referred to as "multitenancy"), one instance of a software application and supporting infrastructure (e.g., virtual machines, memories, etc.) can serve multiple user groups, or tenants. Thus, multiple tenants can share the same application and other computing resources running on the same operating system, on the same hardware, with the same data-storage mechanism(s). Even though resources are shared, each tenant can appear to have its own instance of the application. For example, the underlying data of the tenants can be kept separate and secure. Compared to a single-tenancy computing environment (in which one instance of a software application and supporting infrastructure serves only one tenant), multitenancy can be cheaper, have more efficient resource usage, lead to a lower maintenance cost and have a potentially larger computing capacity. However, efficient tenant management in multitenancy, such as allocating computing resources, can be challenging because of the dynamically changing demands and/or status of the tenants. Accordingly, there remains a need for an improved system and method for intelligent tenant management in a multitenant computing environment.

DETAILED DESCRIPTION

Example 1—Overview of Multitenant Computing System

In a multitenant computing system, a single software instance and/or a virtual machine can serve multiple, distinct tenants. Multitenancy is a feature in many types of cloud computing services, such as infrastructure-as-a-service (IaaS), platform-as-a-service (PaaS), software-as-a-service (SaaS), containers, and serverless computing. For example, a SaaS provider can run a single instance of an application and offer access to individual users. Each user's data can remain isolated, although it can access the same software as other users.

While multitenancy has many advantages compared to single-tenancy, such as reduced cost and improved efficiency and flexibility, it also has technical challenges. One challenge is related to tenant placement. Often a multitenant computing system needs to decide the placement of a tenant across a number of host machines or placement points. The number and points of placement depends on the service infrastructure. For example, if the tenants are placed on virtual machines, then the placement points can be different physical machines. If the tenants are placed on application containers which run on a virtual machine, then the placement points can be virtual machines, along with physical machines. If the tenants are executed as functions, and the functions are executed on application containers or virtual machines, the placement points can vary accordingly. Existing tenant placement strategies do not take into account characteristics of the tenants. As a result, the multitenant computing system may have inappropriate tenant placement, which can cause multiple tenants competing for limited computing resources, such as CPUs or virtual CPUs (vCPUs) memory storages, caches, etc. Another challenge is related to data security. For example, in certain circumstances, security problems or corrupted data from one tenant may spread to other tenants on the same host machine.

Thus, it would be advantageous for an improved tenant management system to support more intelligent tenant placement, mitigate security vulnerability, and provide overall more efficient operation in a multitenant computing environment. Such intelligent tenant management technologies can be applied across a wide variety of enterprise software environments.

Example 2—Example Overview of Intelligent Tenant Management System

Figure 1:
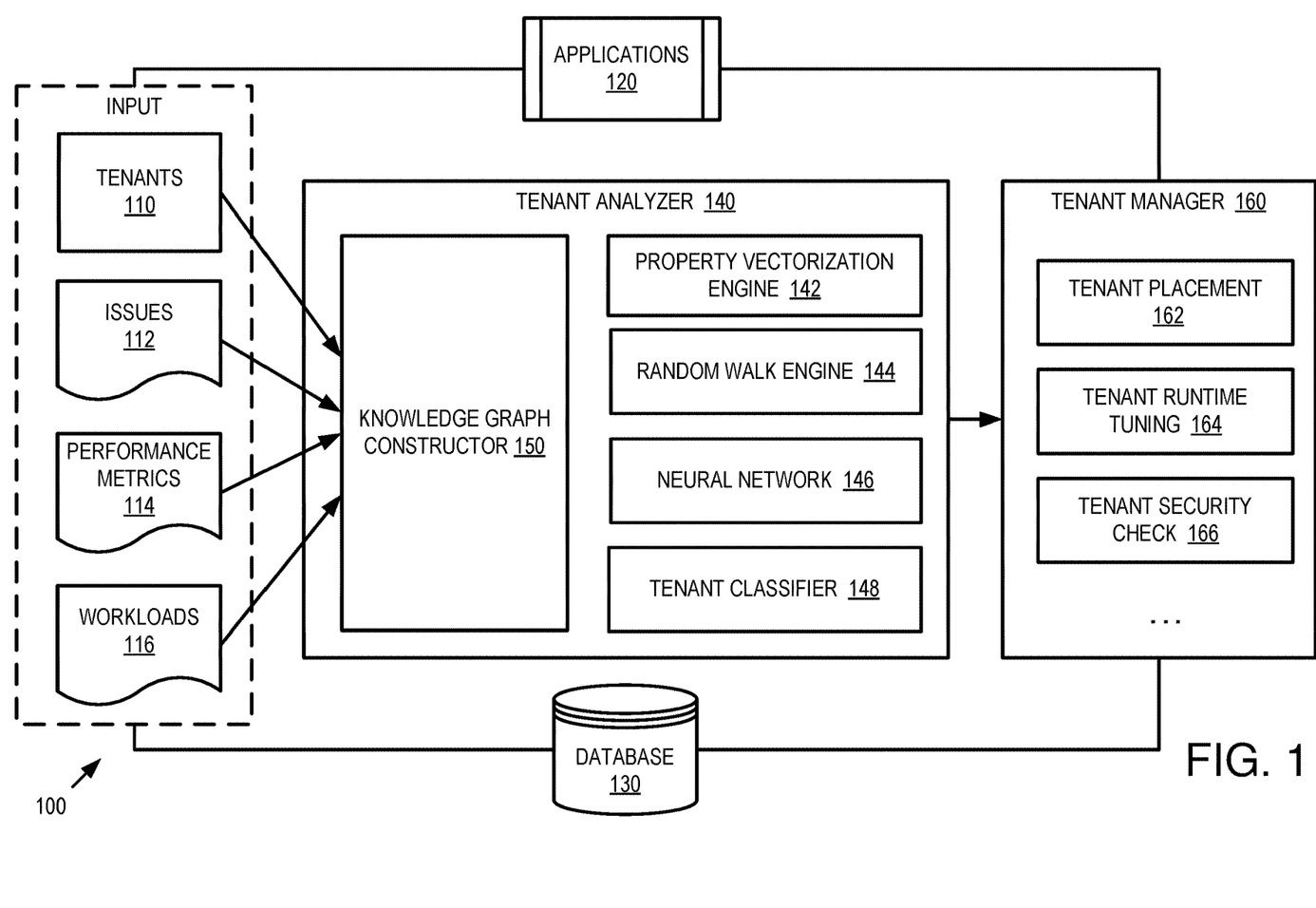
FIG. 1 is an overall block diagram of an example multitenant computing system configured to manage tenants based on analysis of tenant clusters.

FIG. 1 shows an overall block diagram of an example tenant management system 100 supporting intelligent tenant management in a multitenant computing environment. As noted above, in the multitenant computing environment, applications 120 and other computing resources, such as database 130, can be shared by multiple tenants 110.

As shown, the tenant management system 100 can have a tenant analyzer 140, which is configured to classify the tenants 110 into one or more clusters based on similarities of the tenants 110. Specifically, the tenant analyzer 140 can have a knowledge graph constructor 150, which can construct a tenancy knowledge graph based on information of the tenants 110 and their properties. Properties of the tenants 110 can including issues 112 experienced by the tenants 110, performance metrics 114 exhibited by the tenants 110, and workloads 116 incurred by the tenants 110. As described further below, the tenancy knowledge graph can include a plurality of tenant nodes representing respective tenants 110 and a plurality of property nodes representing respective properties (e.g., 112, 114, and 116) of the tenants 110.

The tenant analyzer 140 can include a property vectorization engine 142, which is configured to transform the plurality of property nodes to corresponding property vectors. The tenant analyzer 140 can also have a random walk engine 144, which is configured to perform random walks traversing the tenancy knowledge graph, starting from the plurality of tenant nodes. Such random walks can be fed into a neural network 146 of the tenant analyzer 140 to generate a plurality of tenant vectors corresponding to the plurality of tenant nodes. The tenant analyzer 140 can further include a tenant classifier 148, which is configured to classify the plurality of tenant nodes into one or more tenant clusters based on similarity of the plurality of tenant vectors. Further details of the tenant analyzer 140 and its components, as well as their operations, are described below.

The tenant management system 100 can also include a tenant manager 160, which is configured to manage the tenants 110 based on the tenant clusters identified by the tenant analyzer 140. For example, the tenant manger 160 can include a tenant placement module 162 configured to assign tenants 110 in the multitenant computing environment based on the tenant clusters, a tenant runtime tuning module 164 configured to tune runtime of multiple tenants based on the tenant clusters, and a tenant security check module 166 configured to manage data security of multiple tenants based on the tenant clusters.

In practice, the systems shown herein, such as system 100, can vary in complexity, with additional functionality, more complex components, and the like. For example, there can be additional functionality within the tenant analyzer 140. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the tenant properties, the tenancy knowledge graph, the property vectors, the tenant vectors, the tenant clusters, and the like can be stored in one or more computer-readable storage media or computer-readable storage devices. The technologies described herein can be generic to the specifics of operating systems or hardware and can be applied in any variety of environments to take advantage of the described features.

Example 3—Example Tenant Properties

As noted above, a tenant 110 can be associated with a plurality of properties. Certain tenant properties can include issues 112 experienced by the tenants 110. For example, a tenant 110 running on a shared application may encounter different issues, e.g., bugs, outages, errors/warnings, and the like. In certain embodiments, such issues 112 can be captured in tickets or logs that are kept in text format or other machine-readable documents. For example, certain software applications (e.g., JIRA, HubSpot, etc.) can provide ticket tracking systems that record, monitor, and manage issues encountered by the tenant when running an application. Thus, although issues are descried as properties that can be stored, in practice such properties can be representations of actual issues. For example, an issue can be represented by a ticket identifier, log, text, trouble record, issue identifier, or the like as described herein.

Certain tenant properties can also include performance metrics exhibited by the tenants 110. In one example embodiment, the performance metrics may include utilization rate of computing resources (e.g., CPUs, memories, etc.). For example, the performance metrics of a tenant at a specific time instance may be characterized as 38% CPU utilization and 55% memory utilization, or denoted as {cpu: 38, mem: 55}. In certain embodiments, a tenant's performance metrics can include a hash of the system configurations or hardware limits (e.g., CPU limit, memory limit, process versions, etc.). Thus, the performance metrics of the above example can be denoted as {cpu: 38, mem: 55, hash: xyz}, where xyz denotes generated hash value of the system configurations. The reason to include the above hash in performance metrics is because the utilization rate of computing resources depends on the hardware limits of the computing resources (e.g., 40% CPU utilization on a 2 vCPUs system is different from a 40% CPU utilization of a 4 vCPUs system). Thus, for a specific system with a hardware configuration, the performance metrics can be characterized in reference to hardware limits encoded by the corresponding hash value.

Certain tenant properties can further include workloads 116 incurred by the tenants 110. In certain embodiments, the workloads 116 can be characterized by structured query language (SQL) queries. For example, the workloads of a tenant may be characterized as 20 read queries and 80 write queries, or denoted as {read: 20, write: 80}. In certain embodiments, a parser can be used to generate an abstract syntax tree (AST) of the SQL queries. The AST can capture the context and/or flow of the queries, which normally would not be captured by simple text parsing or some natural language processing tools.

Although workloads, are described as properties that can be stored, in practice, such properties can be representations of actual workloads. For example, workloads can be represented as a workload type, workload amount, abstract syntax tree, or the like, or combinations thereof as described herein.

Example 4—Example Overall Method of Intelligent Tenant Management

Figure 2:
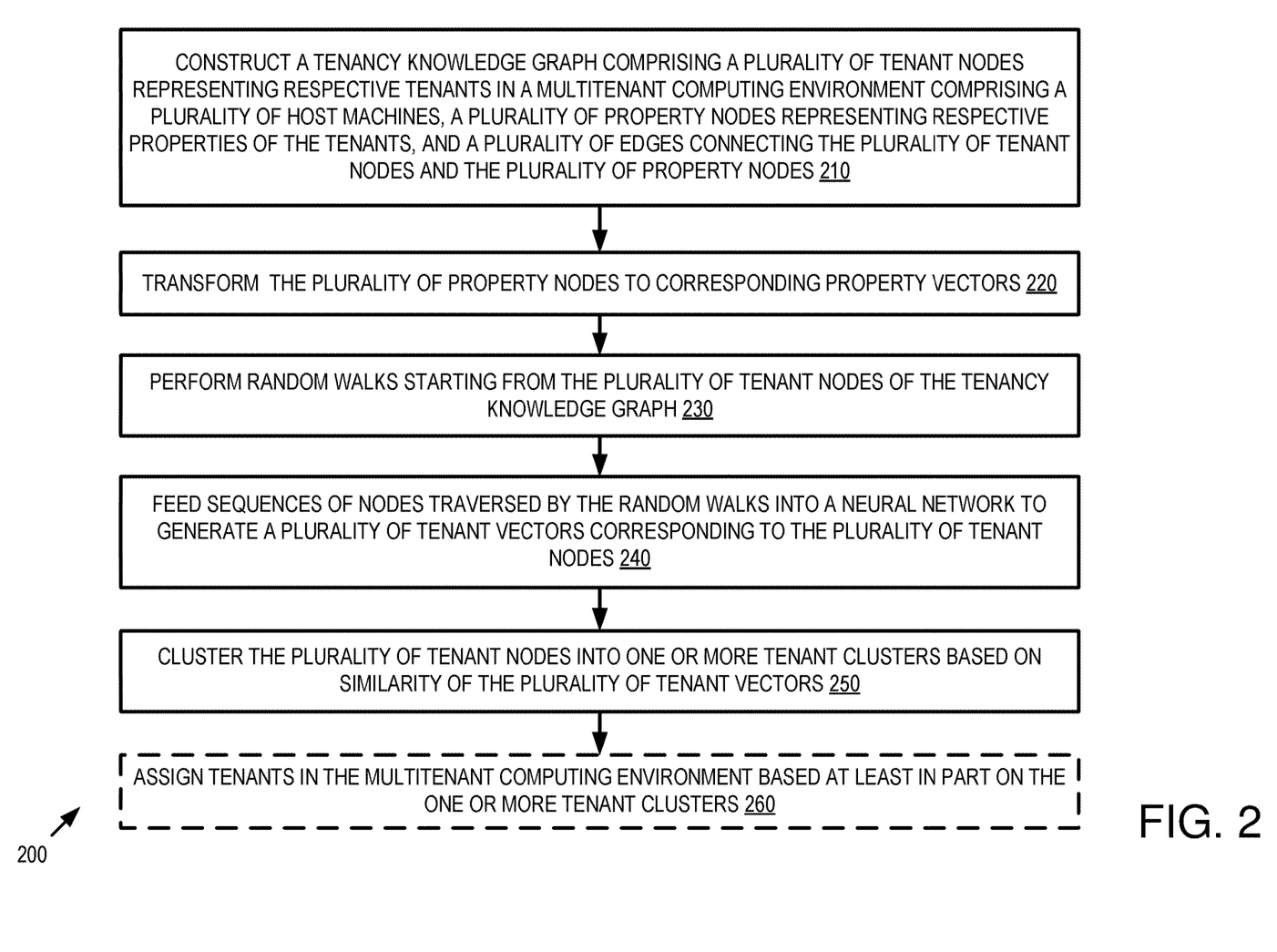
FIG. 2 is a flowchart illustrating an example overall method of analyzing tenant clusters in a multitenant computing system based on tenancy knowledge graph.

FIG. 2 is a flowchart 200 of an example overall method of implementing intelligent tenant management in a multitenant computing environment and can be performed, for example, by the system of FIG. 1.

At 210, the method can construct a tenancy knowledge graph comprising a plurality of tenant nodes representing respective tenants in a multitenant computing environment comprising a plurality of host machines, a plurality of property nodes representing respective properties of the tenants, and a plurality of edges connecting the plurality of tenant nodes and the plurality of property nodes. The plurality of edges can represent relationship between the plurality of tenant nodes and the plurality of property nodes.

At 220, the method can transform the plurality of property nodes to corresponding property vectors.

At 230, the method can perform random walks starting from the plurality of tenant nodes of the tenancy knowledge graph.

At 240, the method can feed sequences of nodes traversed by the random walks into a neural network to generate a plurality of tenant vectors corresponding to the plurality of tenant nodes; and At 250, the method can cluster the plurality of tenant nodes into one or more tenant clusters based on similarity of the plurality of tenant vectors.

Optionally, the method can include additional steps to manage the tenants based on the tenant clusters determined above. For example, at 260, the method can assign tenants in the multitenant computing environment based at least in part on the one or more tenant clusters. For example, tenants can be assigned to respective host machines. Tenant assignment can also include tenant movement support. For example, a tenant can be moved from one host machine to another host machine based on the clustering.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 5—Example Tenancy Knowledge Graph

Generally, a knowledge graph is a special type of database that maintains knowledge or information in a graph form. A typical knowledge graph includes a plurality of nodes (also referred to as "vertices") representing objects and a plurality of edges connecting the nodes, wherein the edges represent relationship between the objects. One common type of knowledge graph is based on the resource description framework, which models statements of facts in expressions of the form subject-predicate-object, known as triples. For example, two nodes connected by an edge can describe a fact, which can be represented as (subject, predicate, object) triples.

As described herein, a tenancy knowledge graph can be constructed from multiple tenants and properties of the tenants, for example, by the knowledge graph constructor 150 depicted in FIG. 1. As such, the tenancy knowledge graph can be a natural representation of tenants and relationships between the tenants and tenant properties.

Figure 3:
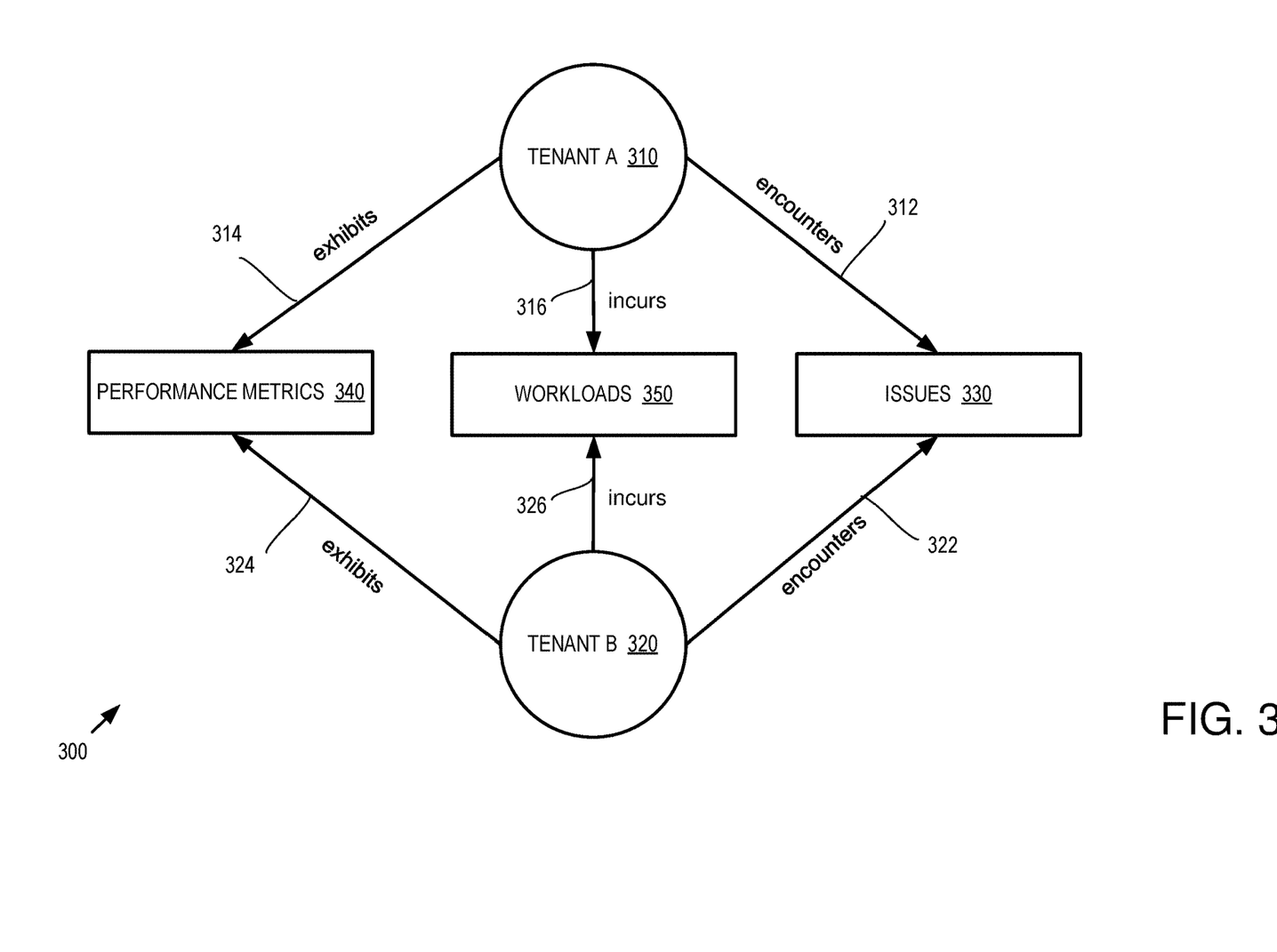
FIG. 3 is an example diagram illustrating a tenancy knowledge graph comprising tenant nodes, property nodes, and edges corresponding to a multitenant computing environment.

As an example, FIG. 3 an example tenancy knowledge graph 300 comprising two tenant nodes 310 and 320 respectively representing Tenant A and Tenant B, and three property nodes 330, 340, and 350 respectively representing issues experienced by the tenants, performance metrics exhibited by the tenants, and workloads incurred by the tenants. The tenancy knowledge graph 300 also includes edges 312, 314, 316, 322, 324, and 326 with specific labels, such as "encounters," "exhibits," and "incurs," which characterize relationships between the tenant nodes 310, 320 and the property nodes 330, 340, and 350. As shown, several facts can be obtained from this knowledge graph, such as (Tenant A, encounters, issues), (Tenant B, encounters, issues), (Tenant A, exhibits, performance metrics), (Tenant B, exhibits, performance metrics), (Tenant A, incurs, workloads), and (Tenant B, incurs, workloads).

Figure 4:
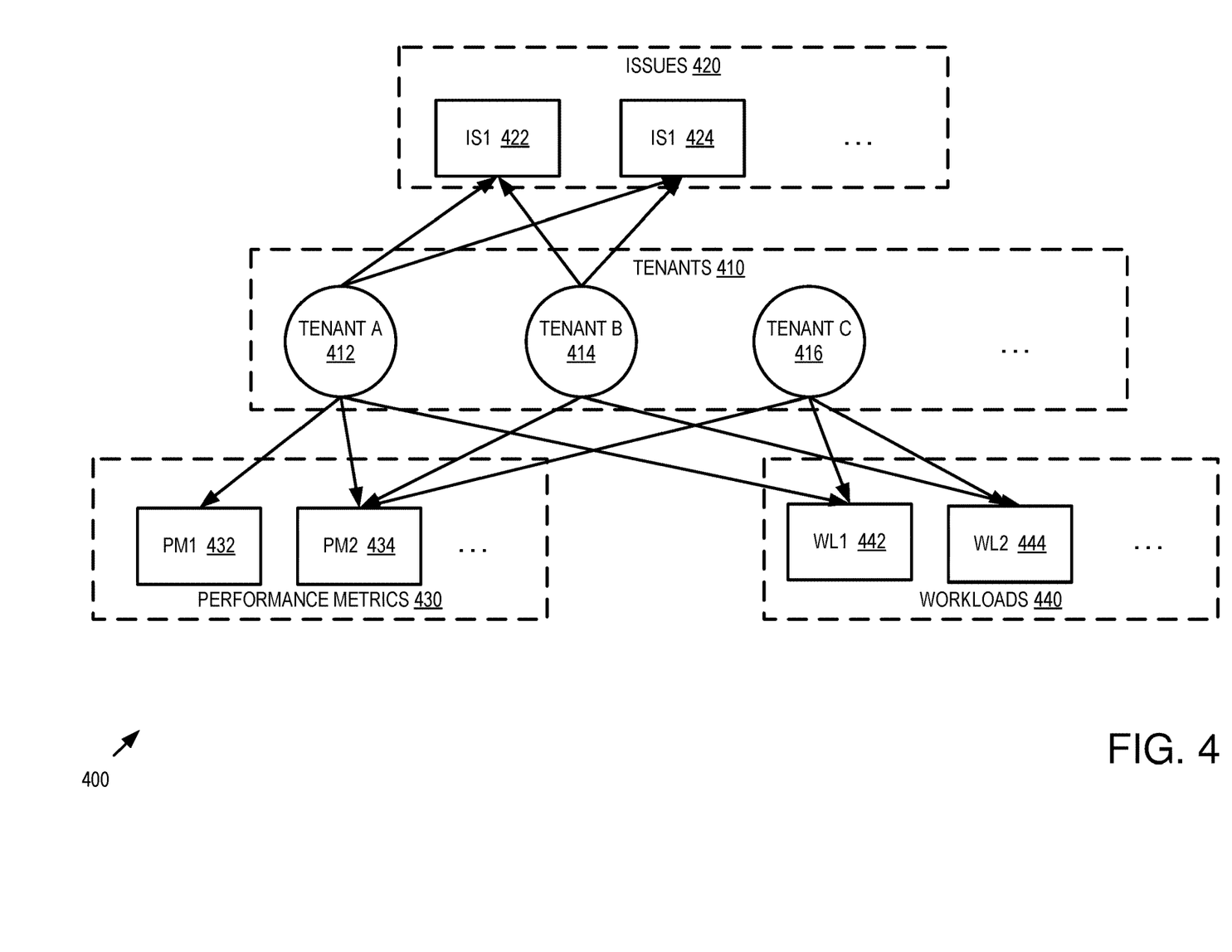
FIG. 4 is an example diagram illustrating a tenancy knowledge graph corresponding to a multitenant computing environment where the property nodes represent issues, performance metrics, and workloads of the tenants.

A multitenant computing environment can have a corresponding tenancy knowledge graph that includes many tenant nodes and many property nodes, wherein some of the tenants may share certain property nodes while some property nodes may be connected to only some of the tenant nodes. As an example, FIG. 4 shows a tenancy knowledge graph 400 comprising a plurality of tenant nodes 412, 414, 416, etc. (collectively 410) respectively representing Tenant A, Tenant B, Tenant C, etc. The tenancy knowledge graph 400 also includes property nodes 422, 424, etc. (collectively 420) representing issues encountered by the tenants, 432, 434, etc. (collectively 430) representing performance metrices exhibited by the tenants, 442, 444, etc. (collectively 440) representing workloads incurred by the tenants. As shown, while Tenant A and Tenant B share the same issues represented by property nodes 422 and 424, Tenant C encounter neither issues. Also, while Tenants A, B, and C all exhibit performance metrics represented by property node 434, only Tenant A exhibits performance metrics represented by property node 432. In addition, while Tenants A and C share workloads represented by property node 442, Tenants B and C share workloads represented by property node 444.

As described below, machine learning techniques, such as the graph neural network, can extract some latent features from the tenancy knowledge graph, such as the similarities of the tenants.

Example 6—Example Method of Vectorizing Tenant Properties

One approach for incorporating a knowledge graph into machine learning models is representation learning, which seeks to learn low dimensional vector representations for the nodes within the knowledge graph, or node embeddings. Through representation learning, the nodes in the knowledge graph can be mapped or encoded to respective numerical vectors. Thus, the distances between these vector representations can meaningfully reflect similarities in the local structure of the nodes in the knowledge graph.

Figure 5:
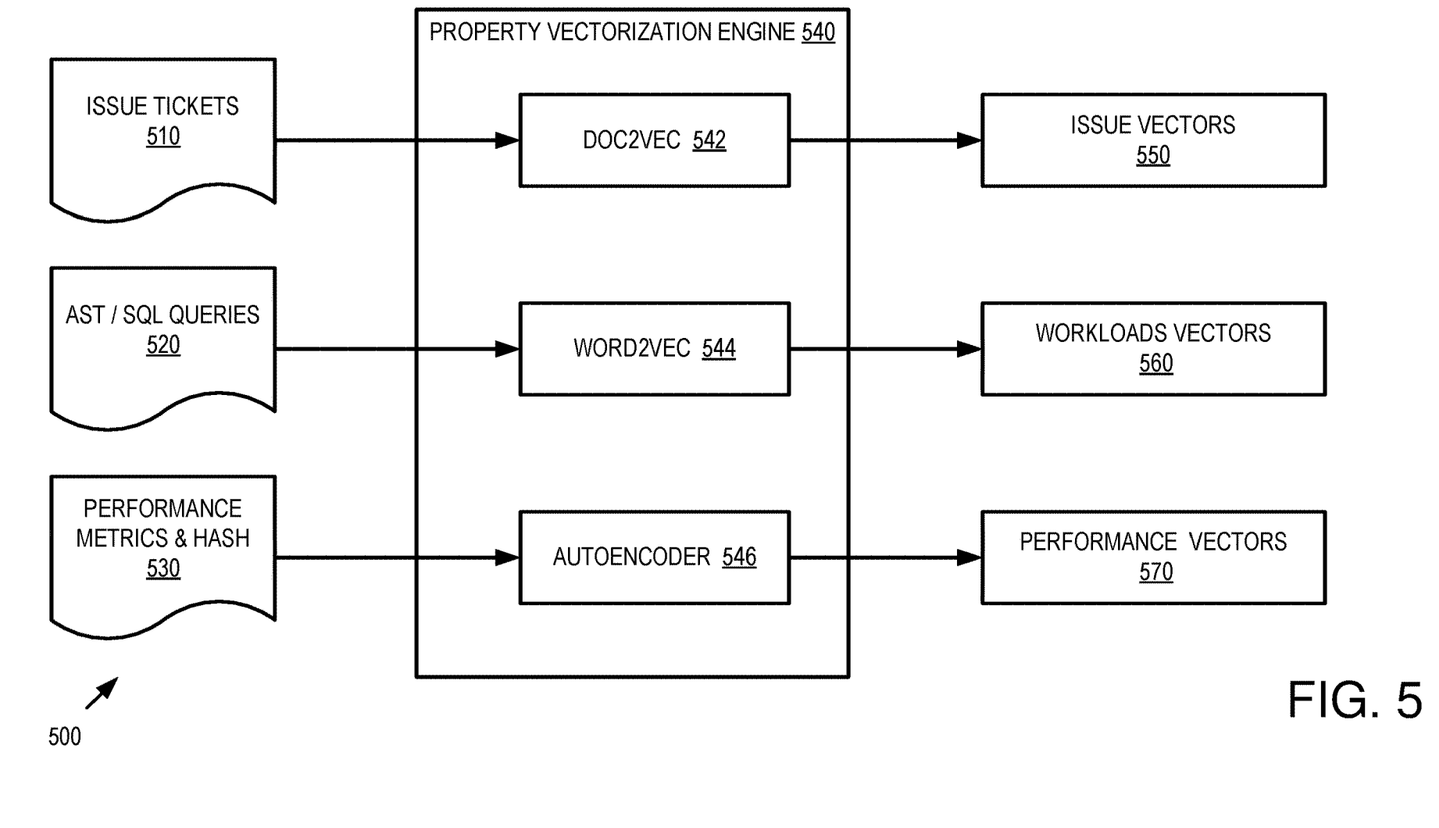
FIG. 5 is a block diagram illustrating converting tenant properties into respective property vectors.

As described herein, a given property of a tenant can be transformed or encoded into a corresponding vector space based on certain embedding learning algorithms. Such transformation or encoding process can also be referred to as property vectorization. Different properties can be vectorized using different embedding learning mechanisms. FIG. 5 is a block diagram 500 illustrating transforming different property nodes in a tenancy knowledge graph to corresponding property vectors by a property vectorization engine 540, which is one example embodiment of 142 depicted in FIG. 1.

As noted above, issues experienced by tenants can be captured in ticket documents that are in text format or machine-readable. In one example embodiment, the property vectorization engine 540 can include a Doc2vec module 542, which is configured to transform ticket documents 510 (i.e., issues) into corresponding ticket vectors 560. Specifically, the Doc2vec module 542 can implement the doc2vec algorithm, which is an unsupervised learning method to learn the document representation and can encode sentences and paragraphs within a document into a numerical vector that represents key features of the document. Thus, by capturing key features of the corresponding ticket documents 510, ticket vectors 560 can model tickets similar to 510 that are experienced by the tenants.

Also as noted above, workloads incurred by tenants can be characterized by SQL queries, which can be further converted into an AST. In one example embodiment, the property vectorization engine 540 can include a Word2vec module 544, which is configured to transform the workloads 520 (e.g., characterized by AST of SQL queries) into corresponding workloads vectors 560. Specifically, the Word2vec module 544 can implement the word2vec algorithm, which uses a shallow neural network model (e.g., two layers) to learn word associations from a large corpus of text. Like doc2vec, word2vec is an unsupervised learning algorithm for word embedding and can encode words into a numerical vector that represents key features of the words. Thus, by capturing key features of the SQL queries 520, workloads vectors 560 can model queries similar to 520 that are incurred by the tenants.

Also as noted above, performance metrics exhibited by tenants can be characterized by utilization rate of computing resources, and sometimes incorporating hash values of system configurations. In one example embodiment, the property vectorization engine 540 can include an Autoencoder module 546, which is configured to transform performance metrics 530 (with or without hashes) into corresponding performance vectors 570. Specifically, the Autoencoder module 546 can implement the autoencoder neural network, which is an unsupervised machine learning algorithm that applies backpropagation, setting the target values to be equal to the inputs. The Autoencoder module 546 can convert the inputs (e.g., performance metrics with hash) into a numerical vector with a reduced size yet still capturing key features of the inputs. Thus, the performance vectors 570 can model performance metrics similar to 530 that are exhibited by the tenants.

It is to be understood that the specific embedding learning algorithms described above (e.g., vec2doc, word2doc, autoencoder) are merely exemplary. Some of the embedding learning algorithms can be changed by using other neural network approaches or alternative embedding algorithms. For example, in certain embodiments, the workloads 520 and/or performance metrics 530 can also be vectorized by using doc2vec algorithm.

Example 7—Example Method of Clustering Tenants

Figure 6:
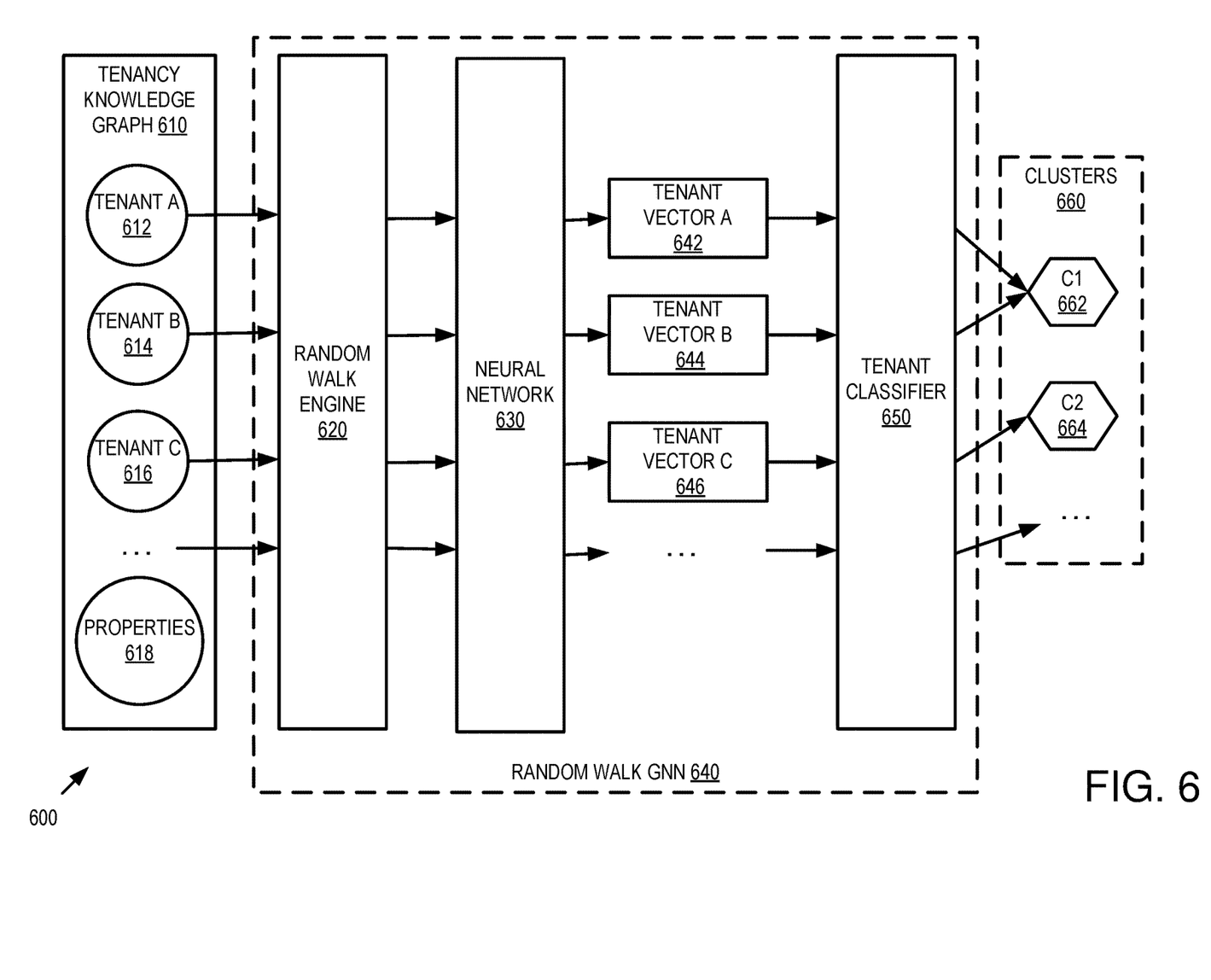
FIG. 6 is a block diagram showing converting tenants into tenant vectors and clustering the tenant vectors.

After transforming tenant property nodes to property vectors, the tenant nodes can also be converted into vector representations, i.e., tenant vectors, which can then be grouped into one or more clusters based on similarity assessment of tenant vectors. FIG. 6 is a block diagram 600 illustrating an example overall method for tenant vectorization and tenant clustering.

In the depicted example, the tenancy knowledge graph 610 includes a plurality of tenant nodes 612, 614, 616, etc., which are connected to a plurality of property nodes 618. The property nodes 618 can be transformed into respective property vectors, as noted above. In an example embodiment, the tenant vectorization and tenant clustering can be implemented by using a random walk graph neural network (GNN) 640 mechanism, the operation of which involves a random walk engine 620, a neural network 630, and a tenant classifier 650, as described below.

The random walk engine 620, which is one example embodiment of 144 depicted in FIG. 1, can perform random walks starting from each of the tenant nodes (e.g., 612, 614, 616). Each random walk can traverse a sequence of nodes, thus capturing relationships of the tenant node and its adjoining property nodes. The sequence of nodes traversed by the random walk can be converted to a textual paragraph, which can then be vectorized, e.g., by using the word2vec or doc2vec embedding learning algorithm.

In certain embodiments, the sequence of nodes traversed by a random walk starting from a tenant node can be fed into a neural network 630 (which can be one example embodiment of 146 depicted in FIG. 1) to generate a tenant vector corresponding to the tenant node. In one example embodiment, the neural network 630 can be configured to implement an embedding learning algorithm (e.g., word2vec, doc2vec) to convert the sequence of nodes traversed by a random walk into a corresponding tenant vector. As described herein, the neural network 630 is a self-supervised learning algorithm which can be trained to learn the relationships each node has with its adjoining nodes in a knowledge graph. Specifically, the neural network 630 can generate node embedding (i.e., a vector representing the node) based on local neighborhood of the node by aggregating information from the node's neighbors. The neural network 630 can be trained to learn a function which captures the relationship between the node and its local neighborhood, and the hidden layer of such neural network can return a vector representing the node (i.e., node embedding). Thus, by applying neural network 630, each tenant node (e.g., 612, 614, 616, etc.) can be represented by a respective tenant vector (e.g., 642, 644, 646, etc.) which captures the relationship of the tenant node with its adjoining property nodes (e.g., the issues experienced by the tenant, the workloads incurred by the tenant, and the performance metrics exhibited by the tenant).

As described herein, latent features of the tenants can be extracted from the tenant vectors that model respective tenants. In one example embodiment, the proximity of tenant nodes (e.g., 612, 614, 616, etc.) can be represented by distance measures between corresponding tenant vectors (e.g., 642, 644, 646, etc.). Thus, a tenant classifier 650 (which can be one example embodiment of 148 depicted in FIG. 1) implementing a data clustering algorithm (e.g., DBSCAN, K-means, OPTICS, etc.) can be used to group the tenant nodes (e.g., 612, 614, 616, etc.) into one or more tenant clusters 660 (e.g., 662, 664, etc.) based on similarity assessment of the corresponding tenant vectors (e.g., 642, 644, 646, etc.). In other words, tenant nodes within one cluster are determined to be more similar to each other than to tenant nodes outside the cluster. Thus, tenants represented by the tenant nodes within a cluster can be deemed to be similar tenants in terms of their behaviors such as issues, performance metrics, workloads. For example, if Tenant A incurred a specific read heavy workload and Tenant B also incurred the same workload, the neural network 630 can embed Tenant A and Tenant B to corresponding tenant vectors that are in close or near-by vector space. Similarly, if both Tenant A and Tenant B have incurred issues, then the closeness of Tenant A and Tenant B can increase in the vector space. As a result, the tenant classifier 650 may group tenant nodes representing both Tenant A and Tenant B into one cluster, i.e., determining Tenant A is similar to Tenant B. Conversely, if the tenant node representing Tenant C is grouped into a different cluster, than it can be determined that Tenant C is dissimilar to Tenant A and Tenant B.

Example 8—Example Intelligent Tenant Management

As described herein, intelligent tenant management can be achieved based on the results of tenant clustering. Specifically, the multitenant computing environment can have a query system configured for rapid analysis of tenancy constructs. For example, based on clustering analysis of tenant vectors, such query system can reveal which tenants incur similar workloads, which tenants encounter similar issues, which tenant consume similar resources, which tenants are outliers that do not belong certain clusters. The extraction of such latent information can help an operator to not only learn internal semantics about tenants in general, but also make intelligent tenant management decisions.

For example, a tenant placement module (e.g., 162) can be configured to make intelligent tenant placement, i.e., assigning tenants in the multitenant computing environment, based at least in part on the results of tenant clustering. In one embodiment, two tenants can be placed in two different host machines when two tenant nodes representing the two tenants are in the same tenant cluster. For example, if two tenants exhibit similar performance metrics and incurred similarly high workloads, these two tenants may be deemed to be similar based on the results tenant clustering. Accordingly, the two tenants can be assigned to two different host machines so that they would not compete for computing resources. In another embodiment, two tenants can be placed in a same host machine when two tenant nodes representing the two tenants are in the same tenant cluster. For example, two tenants experiencing the same issues may be assigned to the same host machine so that such issues can be centrally tracked and resolved in the host machine. As another example, when some JAVA classes are associated with similar workload and/or applications, they could be placed in the same host machine as class caches so as to optimize the system resources. In yet a further example, in a database where each tenant is represented as a logical schema, if multiple tenants using the database have similar workloads or queries, those tenants can be assigned to the same host machine so that the database caches can be shared. As described herein, the tenant placement module can be configured to be "pluggable" so that a specific tenant assignment decision can be accepted or rejected by a system administrator based on dynamic change of load condition in order to achieve load balancing.

In another example, a tenant runtime tuning module (e.g., 164) can be configured to tune runtime of multiple tenants based at least in part on the results of tenant clustering. A tenant's runtime can have a broad range of options or parameters that can be configured that cover process scheduler settings, memory allocation, garbage collection, I/O, and more. Tuning of those parameters can significantly change runtime behavior of the tenant's runtime. According to one example embodiment, tenant runtime tuning can be done for two or more similar tenants. In other words, when tuning one tenant's runtime with specific tunable parameters, the same specific tunable parameters can be used to tune another similar tenant. For example, when tuning one of the Java virtual machine (JVM) running in a microservice using certain optimized parameter values, the same optimized parameters values can be used to tune other JVMs of similar tenants.

In yet another example, a tenant security check module (e.g., 166) can be configured to manage data security of multiple tenants based at least in part on the results of tenant clustering. For example, if a tenant has shown a security issue, there is an increased likelihood that similar tenants may have the same security issue. Thus, based on tenant clustering results, an operator of the multitenant computing environment can quickly identify and resolve potential security issues of similar tenants before such security issue manifest itself in those tenants.

Example 9—Example Advantages

A number of advantages can be achieved via the technology described herein. For example, by constructing a tenancy knowledge graph and embedding tenant nodes in the tenancy knowledge graph into respective tenant vectors, similarity of tenants in terms of their behaviors (e.g., issues, performance metrics, workloads) can be determined based on clustering of tenant vectors. Such similarity assessment of tenants allows more intelligent tenant management in a multitenant computing environment. For example, as described above, more intelligent tenant placement can be achieved based on tenant similarity assessment so as to optimize utilization of computing resources. In addition, more efficient tenant runtime tuning and tenant security management can be achieved.

Example 10—Example Computing Systems

Figure 7:
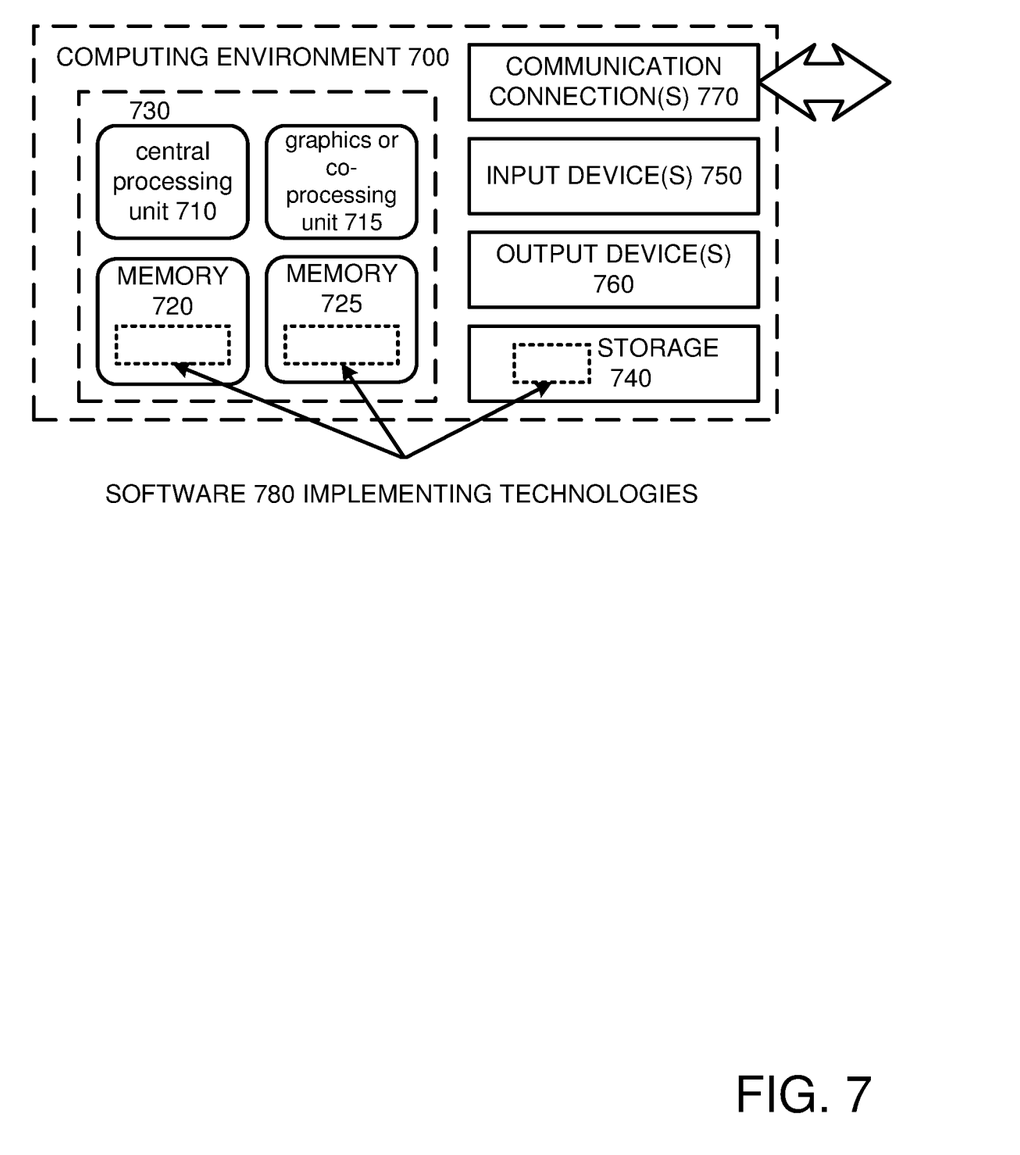
FIG. 7 is a block diagram of an example computing system in which described embodiments can be implemented.

FIG. 7 depicts an example of a suitable computing system 700 in which the described innovations can be implemented. The computing system 700 is not intended to suggest any limitation as to scope of use or functionality of the present disclosure, as the innovations can be implemented in diverse computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 can be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715.

A computing system 700 can have additional features. For example, the computing system 700 includes storage 740, one or more input devices 750, one or more output devices 760, and one or more communication connections 770, including input devices, output devices, and communication connections for interacting with a user. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 can be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software implementing one or more innovations described herein.

The input device(s) 750 can be an input device such as a keyboard, mouse, pen, or trackball, a voice input device, a scanning device, touch device (e.g., touchpad, display, or the like) or another device that provides input to the computing system 700. The output device(s) 760 can be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 11—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 12—Example Cloud Computing Environment

Figure 8:
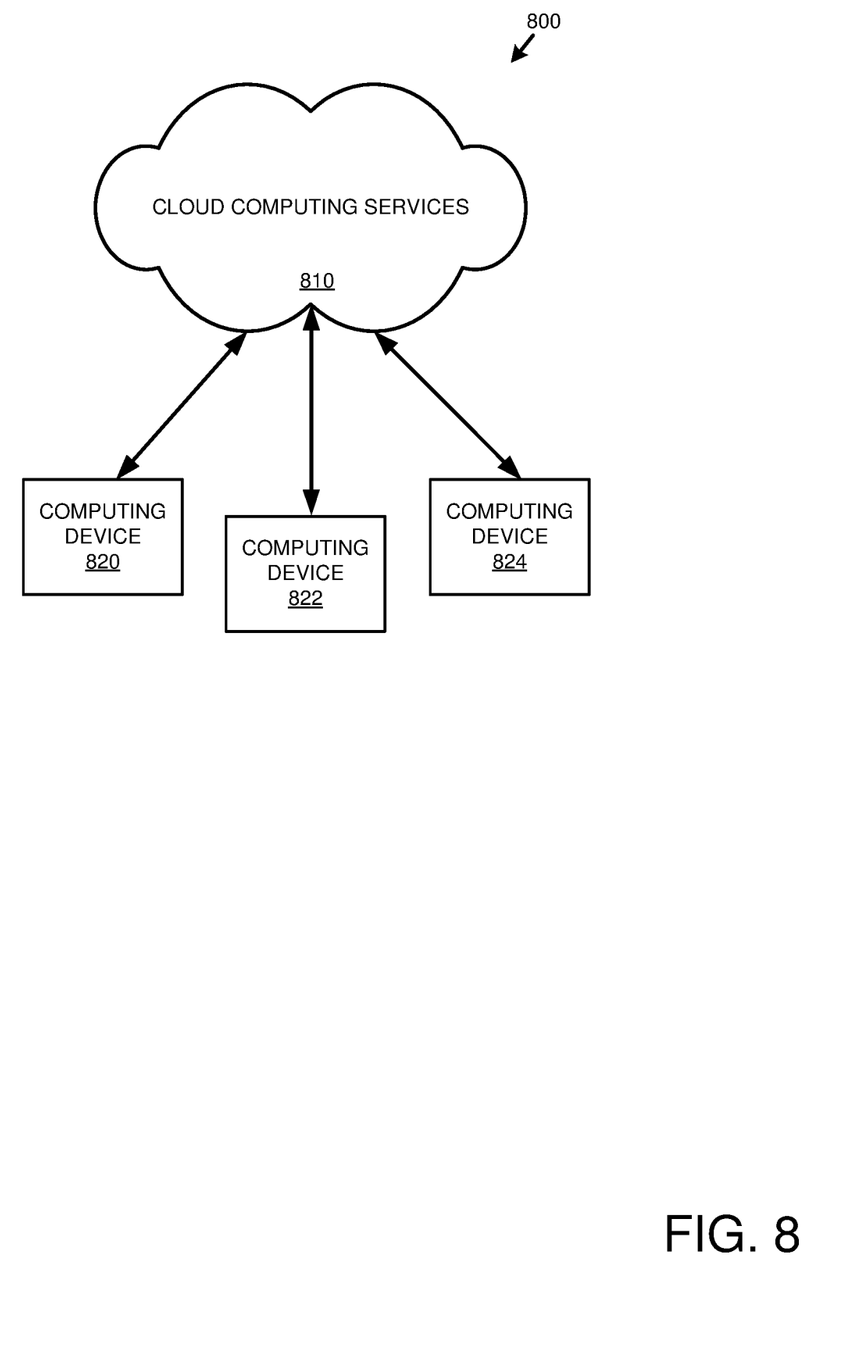
FIG. 8 is a block diagram of an example cloud computing environment that can be used in conjunction with the technologies described herein.

FIG. 8 depicts an example cloud computing environment 800 in which the described technologies can be implemented, including, e.g., the system disclosed above and other systems herein. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 823. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

In practice, cloud-based, on-premises-based, or hybrid scenarios can be supported.

Example 13—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 14—Example Embodiments

Any of the following embodiments can be implemented.

Clause 1. A computer-implemented method comprising:
constructing a tenancy knowledge graph comprising a plurality of tenant nodes representing respective tenants in a multitenant computing environment comprising a plurality of host machines, a plurality of property nodes representing respective properties of the tenants, and a plurality of edges connecting the plurality of tenant nodes and the plurality of property nodes, wherein the plurality of edges represent relationship between the plurality of tenant nodes and the plurality of property nodes;
transforming the plurality of property nodes to corresponding property vectors;
performing random walks starting from the plurality of tenant nodes of the tenancy knowledge graph;
feeding sequences of nodes traversed by the random walks into a neural network to generate a plurality of tenant vectors corresponding to the plurality of tenant nodes; and
clustering the plurality of tenant nodes into one or more tenant clusters based on similarity of the plurality of tenant vectors.

Clause 2. The method of clause 1, further comprising assigning tenants in the multitenant computing environment based at least in part on the one or more tenant clusters.

Clause 3. The method of clause 2, wherein assigning tenants in the multitenant computing environment comprises placing two tenants in two different host machines when two tenant nodes representing the two tenants are both clustered into a same one of the one or more tenant clusters.

Clause 4. The method of any one of clauses 2-3, wherein assigning tenants in the multitenant computing environment comprises placing two tenants in one host machine when two tenant nodes representing the two tenants are both clustered into a same one of the one or more tenant clusters.

Clause 5. The method of any one of clauses 1-4, wherein the properties of tenants comprise issues experienced by the tenants.

Clause 6. The method of clause 5, wherein the issues comprise tickets represented by text, and the act of transforming properties comprises converting the tickets into corresponding issue vectors.

Clause 7. The method of any one of clauses 1-6, wherein the properties of tenants comprise performance metrics exhibited by the tenants.

Clause 8. The method of clause 7, wherein the performance metrics comprise parameters measuring usage of computing resources by the tenants, wherein the act of transforming properties comprises converting the parameters into corresponding performance vectors.

Clause 9. The method of any one of clauses 1-8, wherein the properties of tenants comprise workloads incurred by the tenants.

Clause 10. The method of clause 9, wherein the workloads comprise an abstract syntax tree of queries run by the tenants, and the act of transforming properties comprises converting the abstract syntax tree of queries into corresponding workload vectors.

Clause 11. A system comprising:
one or more processors; and
memory coupled to the one or more processors comprising instructions causing the one or more processors to perform a method comprising:
constructing a tenancy knowledge graph comprising a plurality of tenant nodes representing respective tenants in a multitenant computing environment comprising a plurality of host machines, a plurality of property nodes representing respective properties of the tenants, and a plurality of edges connecting the plurality of tenant nodes and the plurality of property nodes, wherein the plurality of edges represent relationship between the plurality of tenant nodes and the plurality of property nodes;
transforming the plurality of property nodes to corresponding property vectors;
performing random walks starting from the plurality of tenant nodes of the tenancy knowledge graph;
feeding sequences of nodes traversed by the random walks into a neural network to generate a plurality of tenant vectors corresponding to the plurality of tenant nodes;
clustering the plurality of tenant nodes into one or more tenant clusters based on similarity of the plurality of tenant vectors; and
assigning tenants in the multitenant computing environment based at least in part on the one or more tenant clusters.

Clause 12. The system of clause 11, wherein the act of assigning tenants in the multitenant computing environment comprises placing two tenants in two different host machines when two tenant nodes representing the two tenants are both clustered into one of the one or more tenant clusters.

Clause 13. The system of any one of clauses 11-12, wherein the act of assigning tenants in the multitenant computing environment comprises placing two tenants in one host machine when two tenant nodes representing the two tenants are both clustered into one of the one or more tenant clusters.

Clause 14. The system of any one of clauses 11-13, wherein the properties of tenants comprise issues experienced by the tenants.

Clause 15. The system of clause 14, wherein the issues comprise tickets represented by text, and the act of transforming properties comprises converting the tickets into corresponding issue vectors.

Clause 16. The system of any one of clauses 11-15, wherein the properties of tenants comprise performance metrics exhibited by the tenants.

Clause 17. The system of clause 16, wherein the performance metrics comprise parameters measuring usage of computing resources by the tenants, wherein the act of transforming properties comprises converting the parameters into corresponding performance vectors.

Clause 18. The system of any one of clauses 11-17, wherein the properties of tenants comprise workloads incurred by the tenants.

Clause 19. The system of clause 18, wherein the workloads comprise an abstract syntax tree of queries run by the tenants, and the act of transforming properties comprises converting the abstract syntax tree of queries into corresponding workload vectors.

Clause 20. One or more computer-readable media having encoded thereon computer-executable instructions causing one or more processors to perform a method comprising:
constructing a tenancy knowledge graph comprising a plurality of tenant nodes representing respective tenants in a multitenant computing environment comprising a plurality of host machines, a plurality of property nodes representing respective properties of the tenants, and a plurality of edges connecting the plurality of tenant nodes and the plurality of property nodes, wherein the plurality of edges represent relationship between the plurality of tenant nodes and the plurality of property nodes;
transforming the plurality of property nodes to corresponding property vectors, wherein the properties of tenants comprises issues experienced by the tenants, performance metrics exhibited by the tenants, and workloads incurred by the tenants;
performing random walks starting from the plurality of tenant nodes of the tenancy knowledge graph;
feeding sequences of nodes traversed by the random walks into a neural network to generate a plurality of tenant vectors corresponding to the plurality of tenant nodes;
clustering the plurality of tenant nodes into one or more tenant clusters based on similarity of the plurality of tenant vectors; and
assigning tenants in the multitenant computing environment based at least in part on the one or more tenant clusters.

Example 15—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising: constructing a tenancy knowledge graph comprising a plurality of tenant nodes representing respective tenants in a multitenant computing environment comprising a plurality of host machines, a plurality of property nodes representing respective properties of the tenants, and a plurality of edges connecting the plurality of tenant nodes and the plurality of property nodes, wherein the plurality of edges represent relationship between the plurality of tenant nodes and the plurality of property nodes; transforming the plurality of property nodes to corresponding property vectors; performing random walks starting from the plurality of tenant nodes of the tenancy knowledge graph; feeding sequences of nodes traversed by the random walks into a neural network to generate a plurality of tenant vectors corresponding to the plurality of tenant nodes; and clustering the plurality of tenant nodes into one or more tenant clusters based on similarity of the plurality of tenant vectors.

2. The method of claim 1, further comprising assigning tenants in the multitenant computing environment based at least in part on the one or more tenant clusters.

3. The method of claim 2, wherein assigning tenants in the multitenant computing environment comprises placing two tenants in two different host machines when two tenant nodes representing the two tenants are both clustered into a same one of the one or more tenant clusters.

4. The method of claim 2, wherein assigning tenants in the multitenant computing environment comprises placing two tenants in one host machine when two tenant nodes representing the two tenants are both clustered into a same one of the one or more tenant clusters.

5. The method of claim 1, wherein the properties of tenants comprise issues experienced by the tenants.

6. The method of claim 5, wherein the issues comprise tickets re presented by text, and the act of transforming properties comprises converting the tickets into corresponding issue vectors.

7. The method of claim 1, wherein the properties of tenants comprise performance metrics exhibited by the tenants.

8. The method of claim 7, wherein the performance metrics comprise parameters measuring usage of computing resources by the tenants, wherein the act of transforming properties comprises converting the parameters into corresponding performance vectors.

9. The method of claim 1, wherein the properties of tenants comprise workloads incurred by the tenants.

10. The method of claim 9, wherein the workloads comprise an abstract syntax tree of queries run by the tenants, and the act of transforming properties comprises converting the abstract syntax tree of queries into corresponding workload vectors.

11. A system comprising: one or more processors; and memory coupled to the one or more processors comprising instructions causing the one or more processors to perform a method comprising: constructing a tenancy knowledge graph comprising a plurality of tenant nodes representing respective tenants in a multitenant computing environment comprising a plurality of host machines, a plurality of property nodes representing respective properties of the tenants, and a plurality of edges connecting the plurality of tenant nodes and the plurality of property nodes, wherein the plurality of edges represent relationship between the plurality of tenant nodes and the plurality of property nodes; transforming the plurality of property nodes to corresponding property vectors; performing random walks starting from the plurality of tenant nodes of the tenancy knowledge graph; feeding sequences of nodes traversed by the random walks into a neural network to generate a plurality of tenant vectors corresponding to the plurality of tenant nodes; clustering the plurality of tenant nodes into one or more tenant clusters based on similarity of the plurality of tenant vectors; and assigning tenants in the multitenant computing environment based at least in part on the one or more tenant clusters.

12. The system of claim 11, wherein the act of assigning tenants in the multitenant computing environment comprises placing two tenants in two different host machines when two tenant nodes representing the two tenants are both clustered into one of the one or more tenant clusters.

13. The system of claim 11, wherein the act of assigning tenants in the multitenant computing environment comprises placing two tenants in one host machine when two tenant nodes representing the two tenants are both clustered into one of the one or more tenant clusters.

14. The system of claim 11, wherein the properties of tenants comprise issues experienced by the tenants.

15. The system of claim 14, wherein the issues comprise tickets represented by text, and the act of transforming properties comprises converting the tickets into corresponding issue vectors.

16. The system of claim 11, wherein the properties of tenants comprise performance metrics exhibited by the tenants.

17. The system of claim 16, wherein the performance metrics comprise parameters measuring usage of computing resources by the tenants, wherein the act of transforming properties comprises converting the parameters into corresponding performance vectors.

18. The system of claim 11, wherein the properties of tenants comprise workloads incurred by the tenants.

19. The system of claim 18, wherein the workloads comprise an abstract syntax tree of queries run by the tenants, and the act of transforming properties comprises converting the abstract syntax tree of queries into corresponding workload vectors.

20. One or more non-transitory computer-readable media having encoded thereon computer-executable instructions causing one or more processors to perform a method comprising: constructing a tenancy knowledge graph comprising a plurality of tenant nodes representing respective tenants in a multitenant computing environment comprising a plurality of host machines, a plurality of property nodes representing respective properties of the tenants, and a plurality of edges connecting the plurality of tenant nodes and the plurality of property nodes, wherein the plurality of edges represent relationship between the plurality of tenant nodes and the plurality of property nodes; transforming the plurality of property nodes to corresponding property vectors, wherein the properties of tenants comprises issues experienced by the tenants, performance metrics exhibited by the tenants, and workloads incurred by the tenants; performing random walks starting from the plurality of tenant nodes of the tenancy knowledge graph; feeding sequences of nodes traversed by the random walks into a neural network to generate a plurality of tenant vectors corresponding to the plurality of tenant nodes; clustering the plurality of tenant nodes into one or more tenant clusters based on similarity of the plurality of tenant vectors; and assigning tenants in the multitenant computing environment based at least in part on the one or more tenant clusters.

* * * * *